Sept. 11, 1956        D. P. KNODE        2,762,153
PICTORIAL TRANSPARENCIES AND METHOD OF MAKING SAME
Filed Nov. 29, 1954
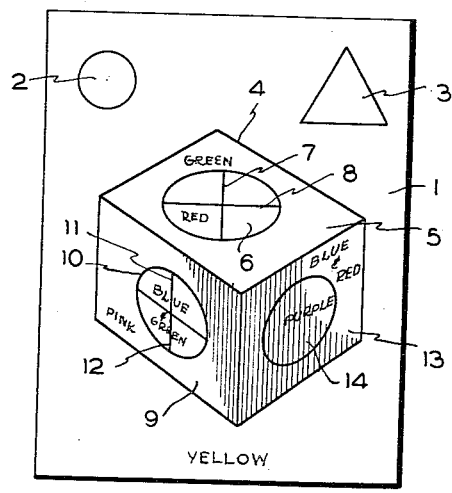
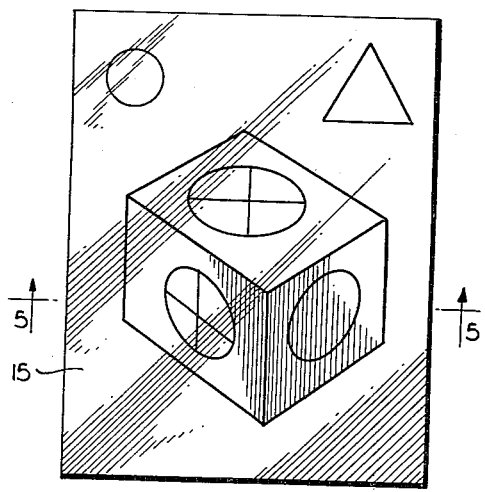
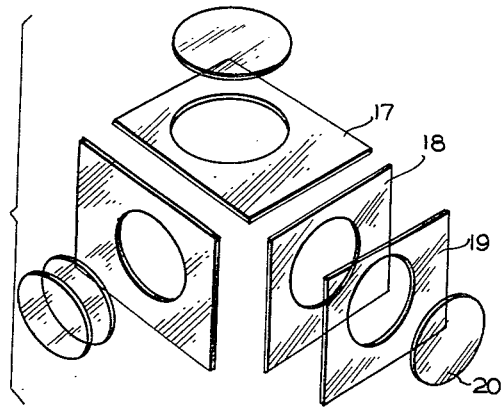
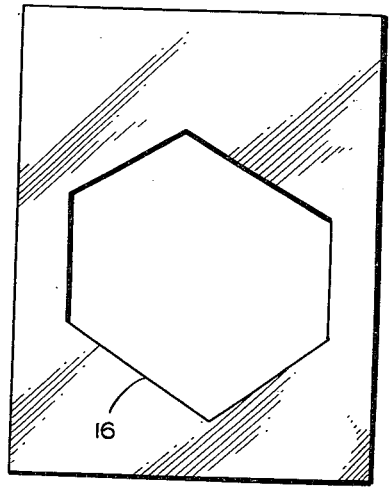
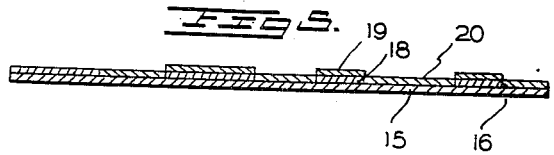
*INVENTOR*
DONALD PULLIAM KNODE
BY *Robert B. Harmon*
*ATTORNEY*

United States Patent Office 2,762,153
Patented Sept. 11, 1956

2,762,153
PICTORIAL TRANSPARENCIES AND METHOD OF MAKING SAME

Donald P. Knode, New York, N. Y.

Application November 29, 1954, Serial No. 471,597

2 Claims. (Cl. 41—21)

This invention relates generally to pictorial transparencies and the method of making the same, and more specifically to transparent pictures to be assembled for either art or amusement purposes.

Transparent pictures constructed in accordance with this invention may find use in covering a window pane to give the pane a "stained-glass" appearance; in the remodeling of lamp shades; in providing amusement for adults and children alike, and in numerous other creative art activities.

The primary object of this invention is to provide a simple and economical pictorial transparency which may be easily assembled.

Another object of this invention is to provide a pictorial transparency which will be instructive as well as amusing to children in creative art work during the assembly thereof.

A more specific object of this invention is to provide a pictorial transparency in which detailed designs, formed on a transparent background, will be clearly visible through various overlays of colored transparent cutout sections, cut out in accordance with the general background design, and applied to the background.

A further object of this invention is to provide a new and improved method of making a pictorial transparency.

With the foregoing and other objects in view, the invention resides in the following specification and appended claims, certain embodiments and details of construction, of which are illustrated in the accompanying drawing, in which:

Figure 1 is a view of a picture having numerous designs thereon;

Figure 2 is a view of a tracing made of the picture of Figure 1 on a transparent sheet;

Figure 3 is an exploded view of the major design portions of the picture in Figure 1;

Figure 4 is a view of a sheet of colored cellophane with a portion thereof cut away in accordance with the dimensions of the major design of Figure 1; and Figure 5 is an exaggerated view in side elevation of a finished picture.

Referring more particularly to Figure 1, a sheet of Bristol-board 1 is shown with various designs 2, 3 and 4—preferably, although not necessarily, printed thereon. The sheet 1 is provided in an art kit including numerous sheets of colored cellophane which is transparent and numerous sheets of clear plastic transparent material. It should be noted that glass could be substituted for the clear plastic transparent material in the practice of the invention.

Now referring to the design 4 on sheet 1, it will be noted that the section 5 has the word "green" printed thereon, indicating the color that this section will have in the final design. Centrally of the section 5 is an elliptical design 6 having cross lines 7 and 8 and the color designation "red" printed thereon.

Section 9 of the design 4 is similar in character to section 5, but designates a different color, namely; "pink." A circular design 10 is provided centrally of the section 9 and is provided with cross lines 11 and 12 and a dual color designation "blue and green."

Section 13 is provided with a dual color designation, i. e., "blue and red" and has a central circular design 14 with the color designation "purple" printed thereon.

The method of constructing the picture and the resulting pictorial transparency will now be described.

A sheet of relatively thick transparent plastic material 15 is placed over the sheet 1. By means of a hard pencil or other implement, all of the lines appearing on sheet 1 are traced onto sheet 15. The sheet 15 is then laid aside until time for the final assembly of the transparency.

The sheet 1 is then cut into sections according to the color designations given the various portions thereof. For example, each major portion 5, 6, 9, 10, 13 and 14 would be separated, during the cutting operation, from each other and from the sheet 1. No cuts would be made of designs 2 and 3 or along lines 7 and 8, or 11 and 12 however, because they fall within the same color designation as the surrounding surface on which they appear.

The sheet 15, having the traced design, is then coated with a thin layer of rubber cement. Rubber cement is also applied to the bottom of each cutout portion of the design 4. Each of the cut out portions is then applied to a piece of cellophane having a color in accordance with the printed designation for that portion of the design 4.

The cellophane is then trimmed about the edge of the cut-out so that it will have the identical contour. The cut-out, with the cellophane attached, is then applied to its appropriate position on sheet 15 which was previously coated with rubber cement adhesive. Before taking this step, the cellophane also may have an additional coat of adhesive to insure a better securement to the sheet 15. After applying the cut-out with the cellophane secured thereto to the sheet 15, the Bristol-board cut-out or pattern is peeled away, leaving a piece of colored cellophane of the proper design on sheet 15.

The only difference in the method described for the application of different designs to the sheet 15, arises from the choice of colors. Thus the section 13 of design 4 is designated as being blue and red. This is accomplished by applying a blue sheet and a red sheet of cellophane to the bottom of cut-out pattern 13 before application to sheet 15. The sheet 16 of cellophane is formed by applying the remainder of sheet 1 to a sheet of yellow cellophane, with subsequent cutting or trimming to make the contour agree. The sheet 16 is then applied to sheet 15 in a manner as described for the designs above.

In Figure 3 the various portions 17 of cellophane made from the cut-out patterns of sheet 1 are illustrated in exploded form. Thus, the cut-out sections 13 and 14 are represented by cellophane pieces 18 and 19, one blue and one red to agree with the color designation on the original sheet 1. It is obvious that all of the pieces of cellophane of Figures 3 and 4 will fit together accurately on sheet 15 to result in a colorful pictorial transparency having the basic design of original sheet 1. The view in Figure 5 illustrates in exaggerated form the sheet 15 with either multiple cellophane elements 18 and 19 or single cellophane element, for example, applied thereto.

After removal of the cut-out portions of sheet 1 any remaining cement may be easily rubbed from the finished picture.

An important feature of the invention will now be considered. It should be noted that the designs as used on the drawing are but for illustrative purposes only. Any design, complicated or simple, may be used on sheet 1. In such designs it usually becomes imperative that certain details be made to stand out in the picture. This may be done by having certain detail lines in the original picture. In the drawing such lines are represented by designs 2, 3, and lines 7 and 8, 11 and 12, which are details of designs. In the finished picture these lines will show clearly through the applied color cellophane pieces, which are quite thin, since they were traced originally on to the sheet 15. This feature becomes important in illustrating shading, depth, facial expressions, etc. in certain pictorial representations.

The finished pictorial transparency may be placed over a pane of glass in a window to give the pane a "stained glass" appearance. Also, the design may be formed into a lamp shade, or may be used for other similar applications.

It is obvious that the pictorial transparencies herein-described could be pre-formed and sold as a product or could be presented to the public in kit-form, so that such transparencies may be made up to suit the different tastes of various individuals.

Thus it is seen that this invention provides new and interesting pictorial transparency, along with the novel manner by which such transparency may be produced.

I claim:

1. The method of making a pictorial transparency which comprises tracing an original design from a sheet of material on a piece of transparent material, cutting the original design into sections according to color designations appearing on the original design, applying cellophane in accordance with such color designations to the cut-out sections by an adhesive, cutting the cellophane so applied to agree in contour with the cut-out pieces, applying the cut-out sections with the cellophane so cut to its proper position on the tracing appearing on the sheet of transparent material, and removing the cut-out portions of the original sheet from the cellophane so applied.

2. A pictorial transparency formed in accordance with a basic design having instructions thereon comprising a backing of transparent sheet material having the complete basic design traced thereon, and pieces of transparent material conforming in shape and color with the instructions of the basic design securely applied to the sheet of transparent material in accordance with said instructions, the said pieces of transparent material being of a relatively minute thickness so as to permit detail lines of the basic design to stand out from the tracing of such design.

References Cited in the file of this patent

UNITED STATES PATENTS

| | | |
|---|---|---|
| 1,772,927 | Bliss | Aug. 12, 1930 |
| 2,001,928 | Alfano | May 21, 1955 |